3,484,410
PROCESS FOR PREPARING POLYESTERS WITH ANTIMONY CATALYSTS
Stanley D. Lazarus, Petersburg, and Poul N. Christensen, Richmond, Va., assignors to Allied Chemical Corporation, New York, N.Y., a corporation of New York
No Drawing. Filed Nov. 23, 1966, Ser. No. 596,451
Int. Cl. C08g 17/015
U.S. Cl. 260—75                    20 Claims

ABSTRACT OF THE DISCLOSURE

A process for the preparation of colorless, linear high molecular weight film and fiber-forming polyalkylene terephthalates either by direct esterification or ester-interchange of terephthalic acid and/or the lower alkyl esters thereof with a glycol having 2 to 10 carbon atoms per molecule to obtain the corresponding diglycol-ester intermediate and then condensing said intermediate in the presence of a catalytic amount of at least one trivalent antimony salt of a higher aliphatic hydrocarbon monocarboxylic acid having at least 12 carbon atoms per molecule.

---

This invention is directed to a process for the preparation of linear, high-molecular weight polyesters having improved properties and more specifically to a process for preparing colorless, high-molecular weight polyalkylene terephthalates and copolymers thereof. The process and the products obtained thereby are prepared by condensing diglycol terephthalate ester intermediates including the modified esters and isomers thereof in the presence of a particular class of antimony compounds as the condensation catalyst.

Still more specifically, this invention relates to a process of preparing colorless, linear high-molecular weight fiber-forming polyalkylene terephthalates and the copolymers thereof either by direct esterification or by an ester interchange of at least one compound selected from the group consisting of (1) terephthalic acid, (2) the lower dialkyl esters of terephthalic acid, (3) the isomers of said acid or esters and mixtures thereof or (4) a blend of at least one of these compounds with a minor amount, e.g., 0.1 to 10% by weight and preferably 1 to 5%, of a modified-terephthalic acid, a modified dialkyl ester or the isomers thereof with an alkylene glycol followed by condensation of the corresponding diglycol ester intermediates in the presence of a particular class of antimony catalysts. The process of this invention provides a means of obtaining film and fiber-forming synthetic, linear polyesters with melting points of at least above 240° C. and in most cases above 250° C.

While there are a number of known catalysts including, for example, antimony trioxide, etc., which have been used primarily because of their improved catalytic effect and limited polymer discoloration, there is still need for a catalyst capable of retarding color formed in the polyester, while at the same time maintaining all of the characteristics desired of a catalyst. The problem of darkening or color is particularly important when the polyesters are to be used as fibers in textiles and the like. Heretofore, various methods have been proposed to minimize or avoid color formation which have included, for example, the use of color inhibitors, e.g., phosphorous acid and the like. A number of these inhibitors, however, while being effective for deactivating the first-stage catalyst, which is partially responsible for the formation of color, are also responsible for other deleterious effects on the polymer including the catalytic side reactions which lead to the formation of ether linkages, etc. These ether linkages and the inhibitors per se, even though present in small amounts, are undesirable since they lower the melting point of the polyesters which limits their use and impairs their resistance to degradation caused by light, heat, etc.

Thus, to avoid these and other problems, it has been found that improved high-molecular weight, linear polyalkylene terephthalates, e.g., polyethylene terephthalate, can be prepared which are substantially colorless and, therefore, useful for the preparation of textile fibers. These polymers are obtained by condensing the diglycol terephthalate ester intermediate in the presence of an effective amount of a particular antimony compound as the catalyst. This antimony condensation catalyst may be characterized as being a trivalent antimony compound which is referred to hereinafter as a salt of the higher hydrocarbon monocarboxylic acids having at least 12 carbon atoms per molecule. These trivalent antimony salts must be either liquid at room temperatures and above or miscible in the alkylene glycol-polymerization mass to provide a homogeneous system for polymerization.

Accordingly, it is an object of this invention to provide a process for preparing colorless, linear polyalkylene terephthalates by using effective amounts of a particular antimony salt as the condensation catalyst.

It is another object of this invention to provide a process for preparing clear-white, linear high-molecular weight polyethylene terephthalate having a melting point above 250° C. and a reduced viscosity of at least 0.5.

It is another object of this invention to provide a process for preparing colorless, linear polyalkylene terephthalates useful for the preparation of textile fibers by condensing the corresponding diglycol terephthalate esters in the presence of an antimony salt characterized as a liquid, trivalent antimony salt of a hydrocarbon monocarboxylic acid having at least 12 carbon atoms per molecule.

It is still another object of this invention to provide a process for preparing colorless, linear polyethylene terephthalate by condensing the diglycol terephthalate ester in the presence of an antimony salt of tall oil acid.

It is still a further object of this invention to provide an antimony catalyst characterized as an antimony salt of a higher aliphatic monocarboxylic acid effective in preventing colored degradation of the polyester.

It is still a further object of this invention to provide an antimony salt as a condensation catalyst for the polymerization of bis-2-hydroxyalkyl terephthalate monomers which may be prepared either by direct esterification of at least one alkylene glycol and terephthalic acid or by an ester-interchange reaction of said alkylene glycol with a lower dialkyl ester of terephthalic acid.

. It is still a further object of this invention to provide an antimony salt as a condensation catalyst for intermediates consisting essentially of bis-2-hydroxyalkyl terephthalate monomers which may be prepared either by direct esterification or by an ester-interchange reaction of at least one alkylene glycol with terephthalic acid, lower dialkyl esters of terephthalic acid, isomers of said acid and esters or a blend of any one of these compounds with a minor amount of a modified terephthalic acid, modified dialkyl ester or the isomers thereof.

It is still a further object of this invention to provide a process wherein a particular antimony salt is used as the condensation catalyst in the preparation of clear, high-molecular weight, linear polyethylene terephthalate having a minimum amount of ether linkages.

These and other objects of the invention will become apparent from a further and more detailed description as follows.

More specifically, this invention is directed to the preparation of polyalkylene terephthalates either by direct esterification or ester-interchange of terephthalic acid and/or the lower alkyl esters thereof with a glycol having 2 to 10 carbon atoms per molecule. These synthetic polymers are high-melting, linear, highly polymerized esters particularly useful for preparing films, textile fibers and the like.

This invention is more specifically directed to a process for preparing colorless, linear, high-molecular weight polyalkylene terephthalates which comprises reacting either by direct esterification or by ester-interchange of an alkylene glycol having from 2 to 10 carbon atoms per molecule with at least one compound selected from the group consisting of (1) terephthalic acid, (2) the lower dialkyl esters of terephthalic acid, (3) the isomers of said terephthalic acid or dialkyl esters and mixtures thereof, or (4) a blend consisting essentially of one or more of these compounds with a minor amount, e.g., 0.1 to 10% or 1 to 5% by weight, of a modified-terephthalic acid, such as a 1 to 30% sulfonated terephthalic acid. In addition to the modified terephthalic acids, it is obvious that other modified compounds including the modified dialkyl esters of terephthalic acid or the isomers of said esters and acids may be added to the blend in a small amount to change the characteristics of the final product, depending upon its ultimate use, e.g., to improve dye-ability, etc. Although the polymers may be prepared by esterifying terephthalic acid and/or the lower alkyl diesters thereof, etc., with one or more glycols having 2 to 10 carbon atoms per molecule, it is preferred to use the lower molecular weight glycols having 2 to 4 methylene groups in that they result in highly polymerized esters having high melting points. These glycols include, for example, ethylene glycol, propylene glycol, butylene glycol and mixtures thereof.

In esterifying terephthalic acid or the lower dialkyl esters of terephthalic acid, etc., the glycols are present during the esterification in amounts ranging from about 1 to 4 molar equivalents of glycol per equivalent of the terephthalic acid or dialkyl ester, etc. The esterification of terephthalic acid may take place in the presence of various known catalysts, including, for example, hydrogen chloride, p-toluene sulfonic acid, etc. Likewise, the ester-interchange reaction between the glycols and the lower terephthalic acid dialkyl esters may be carried out with known catalysts, if desired, which may include, for example, metals such as sodium, potassium, aluminum, zinc, cobalt, nickel, silver, tin, bismuth, antimony, calcium and various other metals and metal salts, e.g., calcium acetate, calcium acetate monohydrate, etc.

The first-stage reaction between the glycol and the terephthalic acid including the modified terephthalic acids and the isomers thereof may take place at temperatures ranging from about 110° to 220° C. either at atmospheric pressure or at pressures ranging up to about 150 p.s.i.g. but more preferably at pressures ranging from about 30 to 150 p.s.i.g. After the terephthalic acid and/or modified acids are esterified with the glycol, the temperature of the reaction mass is subsequently increased whereby the excess glycol, present during the esterification, is removed by distillation usually under reduced pressures. Alternatively, as indicated, the highly polymeric esters of this invention may be obtained by an ester-interchange of the glycol with the lower alkyl esters of the terephthalic acid, including the isomers and the esters of the modified acids which may include, for example, the lower molecular weight alkyl esters such as the methyl, ethyl, propyl, butyl, amyl or hexyl diesters of terephthalic acid, etc. Of these diesters, however, methyl terephthalate is preferred in that it is readily available and is less costly. To effect the ester-interchange, it is necessary to heat the reaction mixture above the boiling point of the alcohol to be displaced but not substantially above the boiling point of the glycol.

As indicated, the esterification reaction may take place with or without the presence of an ester-interchange catalyst and may include various alkali or alkaline earth metals and the metal salts. In the case of the alkali metals, for example, they may be used in the form of their corresponding alcoholates, e.g., sodium alcoholates, which may be obtained by reacting the alkali metal with an alcohol, such as ethyl or methyl alcohol. The intermediate or diglycol terephthalate ester is subsequently heated to temperatures ranging up to about 310° C. to remove the excess glycol, preferably under reduced atmospheric pressures, which facilitates the rapid distilaltion and removal of the glycol. The condensation or polymerization of the diglycol terephthalate ester takes place preferably under reduced atmospheric pressures ranging from about 20 to 0.01 mm. of mercury.

In preparing the linear, high-molecular weight colorless polyalkylene terephthalates of this invention, it is essential to use an antimony compound, herein referred to as a salt of a hydrocarbon monocarboxylic acid, preferably an aliphatic acid, having at least 12 carbon atoms per molecule in amounts ranging from about 0.005 to 0.7% by weight of the terephthalate. It has been found that although the antimony salts have little or no effect in promoting the ester-interchange or esterification reaction in the first stage, they likewise have no deleterious effect on said esterification reaction and, therefore, may be added during the initial stages together with an ester-interchange reaction catalyst, if desired.

The ester-interchange reaction may start at temperatures as low as 110° C. and range up to about 220° C. and preferably from 150° C. to 210° C. for periods from about 1 to 5 hours or more until the alcohol is removed. The polymerization or condensation of the intermediate diglycol terephthalate ester is then carried out at temperatures ranging from 200° C. to 310° C. and more preferably at temperatures ranging from about 225° C. to 310° C. or 240° C. to 280° C., under reduced pressure as low as 0.01 mm. of mercury. The condensation may be carried out under these conditions for periods ranging from 1 to 30 and more preferably from 2 to 10 hours until a polymerization product is obtained which may be characterized as having a reduced viscosity of at least 0.5. The duration of the condensation will depend obviously upon the size of the batch or upon the particular method being used, e.g., batch or continuous process. In the continuous polymerization process, for example, the polymerizing mass is agitated continuously to give maximum exposure to the vacuum which helps to remove the glycol as rapidly as possible. The condensation polymerization is preferably carried out under sub-atmospheric pressures and preferably in an inert atmosphere, e.g., nitrogen, or in the absence of oxygen or oxygen-containing gases.

The alkylene glycols having from 2 to 10 carbon atoms per molecule which may be used in preparing the polyesters of this invention include, for example, trimethylene glycol, ethylene glycol, tetramethylene glycol, pentamethylene glycol, hexamethylene glycol, heptamethylene glycol, nonamethylene glycol, decamethylene glycol, etc. When in the alternative the polyesters are prepared by reacting the lower dialkyl esters with the alkylene glycols, the esters may include, for example, the lower molecular weight alkyl esters such as the methyl, ethyl, butyl, or amyl esters of terephthalic acid, the isomers thereof, and various other terephthalic acid derivatives capable of forming terephthalates under ester-interchange reaction conditions. As indicated, the ester-interchange may take place at atmospheric pressure with temperatures ranging up to about 220° C. for periods ranging up to about 5 hours or more, while the condensation reaction may take place over periods ranging from 1 to 30 hours. The actual reaction time, however, will obviously vary depending upon the concentration of the catalyst, reaction temperatures, reaction pressures, and the viscosity desired of the final.

As previously stated, to carry out the esterification reaction over a reasonable period, it may be necessary to use a first-stage catalyst, many of which have been found to be undesirable in that they have a tendency to degrade the polymer, causing discoloration. The purpose in using an ester-interchange catalyst in the first-stage of the reaction, however, is not only to achieve a rapid reaction rate but also to maintain a high quality product. These aims are often conflicting, however, in that catalysts which enable rapid reaction rates have a tendency to result in discolored products which are obviously unsatisfactory for the preparation of films, fibers, etc. Thus, it is apparent that the selection of the particular catalyst to be used in the first-stage reaction has in the past involved a compromise allowing for improved reaction rates while at the same time maintaining a high quality polymer.

In other words, it was usually necessary to use a first-stage catalyst in order to carry out the esterification reaction over a reasonable period of time. Some effective first-stage catalysts were also effective second-stage catalysts but all of this type caused undesirable degradation reactions and discoloration of the polymer. These first-stage catalysts have been used also in combination with various inhibitors and antimony catalysts, e.g., antimony oxide. This procedure involved inactivation of the first-stage catalyst by the inhibitor at the conclusion of the first-stage reaction followed by the addition of the antimony catalyst which was not affected by the inhibitor but which catalyzed the second-stage reaction without itself causing any significant degradation of the polymer. Unfortunately, however, all of the known antimony catalysts used heretofore for this purpose were readily reduced during the reaction to a black substance which caused a grey discoloration known as "antimony grey." Still there are other effective first-stage catalysts which do not cause significant discoloration or degradation, but these are not effective as catalysts for the second-stage reaction. These catalysts were often used also with an antimony compound as the second-stage catalyst. Here again, however, the problem of "antimony grey" discoloration was present.

It is these problems which the use of the antimony catalyst of this invention avoids in that these antimony salts do not catalyze degradation in the polymers at the temperatures normally used in a spinning operation, e.g., spinning of fibers, etc. Moreover, the antimony salts of this invention provide a high-rate of productivity, and permit the ester-interchange and condensation reactions to be carried out in two steps without any difficulties under routine conditions.

As an example, in accordance with this invention, ethylene glycol may be reacted with dimethyl terephthalate in molar proportions of glycol to terephthalate ranging from 1:1 to 4:1 and more preferably in molar ratios of 1:1 to 3:1. The first-stage ester-interchange reaction may take place at temperatures ranging up to about 220° C. in the presence of a catalyst, e.g., an alkali metal, an alkaline-earth metal or the salts thereof under atmospheric pressures. An ester-interchange catalyst, e.g., calcium acetate monohydrate, may be used in amounts ranging from 0.01 to 0.5 mole percent, based on the weight of the ethylene glycol, and more preferably in amounts ranging from 0.01 to 0.07 mole percent.

In the first-stage reaction, the ethylene glycol and the dialkyl ester of terephthalic acid are reacted until the intermediate bis-hydroxyethyl terephthalate is obtained. Condensation of this intermediate diglycol ester is then directly carried out with removal of glycol and is continued until the desired molecular weight is reached.

The trivalent antimony salts of this invention may be obtained by any of the known methods whereby antimony oxide, for example, can be used to neutralize a higher monocarboxylic acid at temperatures ranging from about 100° to 160° C. and more preferably at temperatures ranging from 130° to 145° C. under reflux conditions until said acid is substantially neutralized and the antimony salt is obtained. The excess metal or unreacted antimony oxide is removed by conventional methods, e.g., filtration, leaving a normal antimony salt. Still another method for preparing the antimony salts may include, for example, the reaction of antimony chloride with the sodium salt of a higher monocarboxylic acid under double-decomposition reaction conditions. By this method, the corresponding sodium chloride and antimony salt of the higher acid are obtained.

These antimony compounds may be characterized as trivalent antimony salts having the formula $Sb-R_3$, wherein R is an organic radical of a simple or complex mixture of aliphatic, hydrocarbon monocarboxylic acids having at least 12 carbon atoms per molecule. In addition to these salts, other salts may include the antimony salts of the higher naphthenic acids having at least 12 carbon atoms per molecule.

The organic acids used in preparing the antimony salts of this invention include the monocarboxylic acids having at least 12 carbon atoms per molecule and more preferably 12 to 22 carbon atoms per molecule. These acids include the saturated fatty acids such as dodecanoic (lauric), tridecanoic, tetradecanoic (myristic), pentadecanoic, hexadecanoic (palmitic), heptadecanoic (margaric), octadecanoic (stearic), nonadecanoic, eicosanoic (archidic), docosanoic (behenic), tetracosanoic (lignoceric), hexacosanoic (cerotic), octacosanoic (montanic), triacontanoic (melissic), dotriacontanoic (lacceroic) and mixtures thereof.

The unsaturated (ethylenic) fatty acids include dodecenoic, tetradecenoic, tridecenoic, pentadecenoic, hexadecenoic, heptadecenoic, octadecenoic, myristoleic, palmitoleic, oleic, cetroleic, linoleic, and linolenic, etc.

The monoalkylalkanoic acids include 2-methyllauric, 7-propylcapric, 2-methylmyristic, 15-methylpalmitic, 2-butylmyristic, 2-methylstearic, 2-ethylstearic, 20-ethylbehenic, 2-hexylstearic, 2-decylstearic, etc. The polyalkylalkanoic acids include 2-butyl-2-ethylnonylic, 3,7,11-trimethyl-lauric, 2,2-dimethylstearic, and 2-methyl-2-ethylarachidic, etc.

Of these acids, the preferred are the higher monocarboxylic fatty acids which may include, for example, oleic acid, palmitic acid, lauric acid, linoleic acid, linolenic acid, and other higher monocarboxylic acids which are liquid at about room temperature or miscible in the glycol-containing polymerization mixture.

In addition to these acids, a still more preferred acid which may be used to form the antimony salts includes tall oil acid which is considered primarily a complex mixture of fatty acids containing abietic, oleic and some saturated fatty acids. These preferred catalysts, e.g., antimony salt of tall oil, may be further characterized as being volatile to the extent of at least 15% during the polymerization when exposed, for example, to a vacuum of about 0.3 to 0.6 mm. to Hg at temperatures of about 275° to 280° C. The antimony salt of tall oil acid can be prepared by heating antimony oxide, for example, at reflux temperatures with agitation until all of the acid is neutralized, as indicated by the acid number of the final product.

As indicated, the preferred antimony salts include the salts of the higher fatty acids and particularly the salts of the complex mixture of tall oil acid. The tall oil acids used in preparing the antimony salts are commercially available and may be characterized as comprising (1) rosin acids (abietic acid), (2) saturated fatty acids including stearic, palmitic and lauric acids, etc., (3) unsaturated fatty acids including oleic acid, linoleic acid, linolenic acid, (4) small amounts of dimerized acids and some unsaponifiables, e.g., sterols. In general, the unrefined tall oils for purposes of this invention may be characterized as follows:

TALL OIL

| | Percent |
|---|---|
| Rosin acids: | |
| Abietic | 20–25 |
| Palustric | 8–10 |
| Neoabietic | 22–27 |
| Dhiydroxyabietic | 4–5 |
| Isodextropimaric | 3–4 |
| Unidentified | 29–43 |
| Unsaturated fatty acids: | |
| Oleic | 46–48 |
| Linoleic | 43–45 |
| Linolenic | 1–2 |
| Saturated fatty acids: | |
| Myristic; palmitic; stearic; arachidic; lauric | 6–8 |
| Unsaponifiables: | |
| Phytosterols | 25–35 |
| Higher alcohols | 5–15 |
| Hydrocarbons | 35–60 |

The tall oils vary in rosin content depending upon the geographic location of the pine tree. Various trees, for example, in Virginia may contain as little as 30–35% of rosin, while on the other extreme, some tall oils may contain as much as 55–60% rosin. The refining of the tall oil may not substantially alter the relative proportions of the rosin and fatty acids present in the original material but it does remove the odors, e.g., mercaptans, and the disulfides and a large portion of the colored material.

However, since the tall oil acids are derived from crude tall oil which contains substantial quantities, e.g., up to 60% of the rosin acids, small amounts of the rosin acids may be present in the refined acid mixture. Thus, the Department of Commerce has accepted the definition of "tall oil fatty acids" as the material produced from crude tall oil containing approximately 90% or more of the free fatty acids, excluding for all practical purposes, any substantial amount of the rosin acids. As a practical matter, those commercially available tall oil acids contain substantially more than 90% of the fatty acids and substantially less than 10% of the rosin acids. A typical example of the commercially available tall oil acids may be characterized as follows:

| | Percent |
|---|---|
| Rosin acids | <10 |
| Saturated fatty acids | 2–20 |
| Oleic fatty acids | 45–70 |
| Linoleic acids | 0–15 |
| Linolenic acids | <2 |
| Dimerized acids | 2–25 |
| Unsaponifiables | <5 |
| Iodine numbers | 60–110 |

Still there are other tall oil acids currently available which are characterized as having rosin acids in amounts ranging from 0.3 to 6% and unsaponifiables in amounts ranging from 0.3 to 4%. Since it is the unsaponifiables present in the tall oil acids which contribute to the poor color, heat stability and odor, it is desirable in preparing the antimony compounds for purposes of this invention to use the highly refined tall oils which contain a minimum amount of these materials. A typical example of a refined tall oil acid may be characterized as having a Gardner color of 3 to 6, an acid number of 194 to 200, a saponification number of approximately 196, an iodine number of about 130 and a rosin acid content of about 0.6 to 1.5%. The fatty acids present may include, for example, 48% linoleic acid, 50% oleic acid, and the saturated acids, e.g., stearic, etc., in amounts of approximately 2%. The preferred tall oil acids are the highly refined or double-fractionated tall oil acid mixtures comprising about 96.8% of the fatty acids, e.g., 46% linoleic acid, 48% oleic acid and 2% unsaturated acid, and about 1% of the rosin acids, and 2.2% of the unsaponifiables.

The following examples illustrate the use of antimony salts as condensation catalysts in the preparation of polyesters, e.g., polyalkylene terephthalates, in accordance with this invention:

EXAMPLE I

Solid terephthalic acid and ethylene glycol containing about 0.1% by weight of antimony tallate (antimony salt of a tall oil acid) uniformly distributed therein, were separately metered into a homogenizer in a glycol to terephthalic acid mole ratio of 1.8 to 1 to obtain a smooth homogeneous transportable paste. The paste was fed by a gear pump to an esterification vessel operating at 60 p.s.i.g. at 240° C. The water of reaction was withdrawn via a rectification column. The mass from the esterification vessel was subsequently pumped to a flasher where the reaction mixtrue was contacted with a countercurrent of hot, inert gas while the pressure was reduced to about one atmosphere. The esterified product was then metered into a vessel comprising agitation means and having a temperature of about 270° C. The reactor was fitted with glycol spray condensers where 80% of the theoretical amount of the glycol was removed at 55 mm. of mercury absolute pressure.

The melt from this reactor was discharged into a prefinisher vessel and the temperature was increased to about 280° C. with the pressure being reduced to about 2 mm. of mercury absolute pressure. Here, most of the remaining glycol in excess of a 1:1 molar ratio with respect to the terephthalate was removed. From the prefinisher the melt was metered into an extruder-type finisher vessel operated at 0.1 mm. of mercury absolute pressure and at a polymer temperature of 280° C. The effluent polymer from the finisher had a whiteness index of 93 and a reduced viscosity of 0.65. The polymer was characterized as having a melting point of 254° C. as measured by Differential Thermal Analysis. This particular polymer was capable of being spun to form strong, uniform, high-quality continuous fibers.

EXAMPLE II

Approximately 0.10 parts by weight of zinc acetate dihydrate and 0.22 parts by weight of antimony tritallate (antimony salt of a tall oil acid) was uniformly mixed with 124 parts by weight of ethylene glycol at 20° C. The mixture was charged into an interchange reactor followed by the addition of 194 parts by weight of molten dimethyl terephthalate having a temperature of 150° C. The interchange reaction was conducted at 150–220° C. over a period of about 5 hours with the evaporation of methanol and glycol. The methanol was continuously withdrawn via a rectification column with the glycol being recycled to the reactor. After the reaction was completed as indicated by the amount of condensed methanol recovered, the glycol recycle was stopped. The reaction temperature was increased to 240° C. where 40% of the excess glycol was removed at atmospheric pressure. At this point, the product was transferred to a polymerization kettle having agitation means wherein there was then added 0.85 parts by weight of a homogeneous solution consisting of 74% of an organic phosphite, e.g., triphenylphosphite, and 26% of antimony tallate (antimony salt of tall oil acid).

The organic phosphite serves to inactivate the first-stage ester-interchange catalyst, e.g., a zinc compound, while the antimony tritallate is effectively used as the condensation polymerization catalyst. The vacuum cycle was started and programmed so that about 0.1 mm. of mercury absolute pressure was reached in about 45 minutes with the temperature being increased from 240° C. to 270° C. After about 4 hours under a vacuum at 275° C., the desired viscosity was obtained. The agitation was stopped, the vacuum was broken with inert gas, and the pressure was increased to 60 p.s.i. for extrusion. The extruded polymer had a whiteness index of 91 and a reduced viscosity of 0.70. The polymer was further characterized as having a melting point of 254° C. as measured by Differential Thermal Analyses.

The products obtained by the process of this invention charged to a single-neck round bottom 500 ml. flask together with ¾ inch diameter stainless steel balls. The flask was placed on a Rinco rotary evaporator spindle and submerged in a molten salt bath at 200° C. The temperature was increased to 290° C. over 90 minutes. A vacuum was used until the bath reached a temperature of 280° C., then the vacuum was increased until a pressure of 0.1 mm. of mercury was obtained. The polymerization was continued for about 4 hours under conditions of high temperature and low pressure. The polymer was removed under nitrogen in a molten condition and subjected to the following test shown in Table I.

TABLE I.—PROPERTIES OF POLYETHYLENE TEREPHTHALATE PRODUCED WITH VARIOUS ANTIMONY CATALYSTS

| Catalyst | Antimony Salt Catalysts Compared to Solid $Sb_2O_3$ | | | | | |
|---|---|---|---|---|---|---|
|  | Red. OCP Visc. | End COOH | Groups OH | M.P., °C. | Tg | Index Whiteness [1] |
| Antimony trilinoleate | 0.59 | 30 | 133 | 254 | 54 | 88 (white). |
| Antimony trioleate | 0.57 | 33 | 135 | 254 | 54 | 90 (white). |
| Antimony trioxide | 0.57 | 31 | 138 | 252 | 56 | 80 (grey). |

[1] Measured by the method in the American Dyestuff Reporter.

are characterized as having a reduced orthochlorophenol viscosity of at least about 0.5 which are suited for the production of a strong melt-spun filament. More specifically, the reduced viscosity of the polyester obtained by this invention was determined by viscosity measurements carried out on a sample of the polymer dissolved in purified orthochlorophenol containing 0.1% of water, at 250° C., at a concentration of 0.5%. By employing a standard Cannon-Fenske 150 bore viscometer, the flow time of the polymer solution ($t_p$) is measured relative to the flow time of the solvent ($t_s$) and the reduced viscosity is calculated using the following equation:

$$n_{red} = (n_r - 1)/C$$

where:
$n_{red}$ = reduced viscosity
$C$ = concentration of dissolved polymer in grams/100 ml.
$n_r$ = relative viscosity = $t_p/t_s$ For purposes of this invention, the polymer color or whiteness is reported in terms of the Whiteness Index which is determined in accordance with the procedure stated in American Dyestuff Reporter 54, No. 7, pages 246–251 (1965). This method employs standard reflectance measurements and utilizes the equation:

$$W = 4B - 3G,$$

where:
$W$ = whiteness index relative to magnesium oxide
$B$ = blue reflectance value
$G$ = green reflectance value Thus, in accordance with this procedure, the polyesters prepared in accordance with this invention may have a whiteness index ranging between 85 and 120.

EXAMPLE III

For purposes of comparison, the above examples were repeated wherein approximately an equivalent amount of antimony trioxide, for example, was substituted for the antimony tallate with all other conditions remaining substantially the same. More specifically, the polyester prepolymer was prepared by ester-interchanging 970 parts by weight of dimethyl terephthalate with 620 parts by weight of ethylene glycol in the presence of 0.55 parts by weight of zinc acetate at temperatures starting at 170° C. and finishing at 210° C. The reaction continued for about 4 hours, and 400 parts by weight of methanol were distilled from the reaction mixture. This prepolymer or intermediate was condensed with antimony oxide $Sb_2O_3$ wherein the antimony catalyst was used in amount to provide 0.025 gram atoms of antimony per gram mole of benzene ring. About 50 parts by weight of the prepolymer were The effectiveness of the antimony salts as polyalkylene terephthalate condensation catalysts in accordance with this invention can be seen by their resistance to reduction in the presence of a reducing agent (TNPP), trisnonylphenyl phosphite, in comparison to other known catalysts. Since it is the reduction of the metal during the polymerization process that is in part responsible for the discoloration of the polymer, it is essential that the catalyst be substantially resistant to reduction at polymerization temperatures, as indicated by comparing the following results:

TABLE II

| Antimony compounds: | Time for reduction (Minutes) |
|---|---|
| Sb-triacetate | 7 |
| Sb-trioxide | 9 |
| Sb-tritallate | 21 |
| Sb-trioleate | 21 |
| Sb-trilinoleate | 21 |

It can be seen from the data in Table II that the antimony salts of the higher molecular weight acids of this invention have a higher stability toward reduction than the other commonly known antimony compounds used heretofore in preparing polyalkylene terephthalates.

EXAMPLE IV

About 580 parts by weight of terephthalic acid, 430 parts by weight of ethylene glycol and 0.068 mole percent of a number of different catalysts as shown in Table III below, based on the weight of the terephthalic acid, was charged to a two-liter stainless steel flask. The bolted cover was provided with openings for an agitator shaft, nitrogen inlet, thermocouple, and bleed-line, the latter being connected to a pressure gauge. The flask was heated by means of an electric mantle.

After purging with high-purity nitrogen, the flask was sealed, the paddle agitator was started at 10 r.p.m., and the mantle heater was turned on. The pressure was built up to about 35 p.s.i.g., at a temperature of 230° C. in one hour and 15 minutes. The agitator was set at 18 r.p.m. The bleed valve was manipulated to maintain 35 p.s.i.g. for 4 hours. During the time of this procedure, the temperature gradually increased to 240° C. and at the end of about 4 hours, there was no further increase of pressure. The pressure was then released and the batch was dropped into a two-liter beaker through an extrusion port at the bottom of the steel flask. The resulting prepolymer was perfectly white.

About 50 parts of this prepolymer were placed in a single-neck 500 ml. flask. This was connected to a 500 ml.

stainless steel flask by means of a 20/40 tapered joint and the steel flask was connected to a Rinco rotary evaporator spindle by means of a second 20/40 tapered joint. The flask was placed in an oil bath and the steel condenser flask in an ice bath. The oil bath was heated in 1½ hours to 280° C. while the flasks were rotated in a horizontal plane with the glass flask being about 40% submerged in the oil. The pressure in the system was measured as 0.05 mm. of mercury by means of a McLeod gauge. The polymerization was conducted for about 2 hours under this pressure and at a temperature of about 280° C. The characteristics of the polymerized products obtained with the various catalysts are shown in Table III, below.

TABLE III

| Catalyst | Reduced viscosity [1] | M.P., °C. | Color |
| --- | --- | --- | --- |
| Bismuth stannate | 0.41 | 257 | Grey. |
| Lead stannate | 0.51 | 257 | Ligt-cream. |
| Nickel stannate | 0.33 | 255 | Grey. |
| Sodium bismuthate | 0.38 | 254 | Do. |
| Antimony trioxide | 0.62 | 250 | Do. |
| Sodium antimonate | 0.33 | 257 | Cream. |
| Antimony sodium tartrate | 0.31 | 257 | Light-cream. |
| Tetra-n-butyl orthotitanate | 0.50 | 242 | Tan. |
| Antimony salt of Tall Oil acid | 0.70 | 254 | White. |

[1] In orthochlorophenol.

It should be noted from the data in the above table that the various catalysts including antimony trioxide gave products which had a color ranging from light to dark-grey in comparison to the antimony salts of the higher monocarboxylic acids, e.g., antimony salts of tall oil acids, as shown above, for example, and in the data in Table I.

EXAMPLE V

Approximately 0.10 parts by weight of zinc acetate dihydrate and 0.22 parts by weight of antimony tritallate (antimony salt of a tall oil acid) were uniformly mixed with 124 parts by weight of ethylene glycol at 20° C. The mixture was charged into an interchange reactor followed by the addition of 174.6 parts by weight of molten dimethyl terephthalate and 19.4 parts by weight of dimethyl isophthalate having a temperature of 150° C. The interchange reaction was conducted at 150–220° C. over a period of about 5 hours with the distillation of methanol and glycol. The methanol was continuously withdrawn via a rectification column with the glycol being recycled to the reactor. After the reaction was completed as indicated by the amount of condensed methanol-recovered, the glycol recycle was stopped. The reaction temperature was increased to 240° C. where 40% of the theoretical glycol in excess of 1:1 molar ratio with respect to the terephthalate was removed at atmospheric pressure. At this point, the product was transferred to a polymerization kettle having agitation means wherein there was then added 0.85 parts by weight of a homogeneous solution consisting of 74% of triphenylphosphite, and 26% of antimony tallate (antimony salt of tall oil acid).

The organic phosphite serves to inactivate the first-stage ester-interchange catalyst while the antimony tritallate is effectively used as the condensation polymerization catalyst. The vacuum cycle was started and programmed so that about 0.2 mm. of mercury absolute pressure was reached in about 45 minutes with the temperature being increased from 240° C. to 270° C. After about 4 hours under vacuum at 275° C., the desired viscosity was obtained. The agitation was stopped, the vacuum was broken with inert gas, and the pressure was increased to 60 p.s.i. for extrusion. The polymer had a melting point of 240° C. as measured by Differential Thermal Analyses.

The polyesters of this invention have melting points (MP° C.) above 240° C. and preferably in most examples above 250° C. The melting points of the polyesters, e.g., the polyalkylene terephthalates prepared in accordance with this invention, are obtained by Differential Thermal Analysis (DTA) wherein, for example, a 5 to 8 mg. sample previously annealed at 180° C. for 4 hours is placed in an aluminum dish which is put in the DTA instrument (Stone Model 12B). After proper instrument settings, the thermogram of the sample, under nitrogen, is recorded from ambient temperature to 300° C. The melting point is determined as that temperature at which there is an endothermic peak. The reproducibility of the melting points in accordance with this method is ±1° C.

In the course of the polymerization, it is obvious that other additives may be added to the polymer for the particular properties desired in the final product. These ingredients may include, for example, flame-retardants, delustrants, anti-static agents, adhesion promoting agents, heat and light stabilizers, pigments, fluorescent agents, brighteners, other polymers, cross-linking agents, dyestuff precursors, bacteriostats, and the like.

In addition to these materials, it is also desirable to incorporate within the polyesters of this invention an organic phosphite, e.g., an alkyl or aryl phosphite, as an inactivating agent for the first-stage ester-interchange catalyst. These catalysts have been known to react with the ester during the condensation reaction causing degradation and discoloration of the polymer. Thus, by adding a phosphorus compound, it is possible to obtain polyesters of better whiteness than ordinarily would be possible without the addition. However, as indicated, while it is not always necessary to use an inactivator, it may be desirable particularly with some catalysts. It is believed that the phosphite, for example, functions as a chelating agent with the first-stage catalyst, e.g., calcium acetate, and converts the metal to a miscible material which is inert with respect to the ester. The amount of the phosphorus compounds to be used will depend obviously upon the degree of discoloration normally caused by the particular metal and includes preferably the trivalent phosphorus compounds, e.g., phosphorous acid, the triaryl phosphites, etc.

The polyesters obtained in accordance with this process utilizing the antimony salts as the catalyst for the condensation polymerization are especially adaptable for extrusion to highly transparent films, textile fibers, coatings and the like, which are useful in the wrapping and packaging industries.

While this invention has been described with respect to a number of specific embodiments, it is obvious that there are other variations and modifications which can be resorted to without departing from the spirit of the invention, as particularly pointed out in the appended claims.

What is claimed is:

1. A process for preparing colorless, linear high-molecular weight film and fiber forming polyalkylene terephthalates which comprises esterifying terephthalic acid or a lower dialkyl ester thereof with an alkylene glycol having 2 to 10 carbon atoms per molecule to obtain the corresponding diglycol-ester intermediate; condensing said intermediate at temperatures ranging from about 200° C. to 310° C. with an effective amount of a condensation catalyst which is at least one trivalent antimony salt of an aliphatic hydrocarbon monocarboxylic acid having at least 12 carbon atoms per molecule and which trivalent antimony salt is liquid or miscible in the condensation reaction medium.

2. The process of claim 1 wherein the antimony salt is a salt of a higher fatty acid.

3. The process of claim 1 wherein the antimony salt is a salt of mixtures of higher fatty acids miscible in the condensation reaction medium.

4. The process of claim 1 wherein the antimony salt is a liquid salt of tall oil acid.

5. The process of claim 1 wherein the condensation of the diglycol-ester intermediate takes place under reduced atmospheric pressures.

6. The process of claim 1 wherein the intermediate is condensed at temperatures ranging from about 225° to 310° C. until the polycondensation product has a reduced viscosity of at least about 0.5 measured on a polymer sample dissolved in purified orthochlorophenol containing 0.1% water at 250° C. at a concentration of 0.5%.

7. A process for preparing colorless, linear, high-molecular weight film and fiber forming polyalkylene terephthalates which comprises esterifying terephthalic acid or a lower dialkyl ester thereof with ethylene glycol to obtain the corresponding diglycol-ester intermediate; condensing said intermediate at temperatures ranging from about 225 to 310° C. with an effective amount of a condensation catalyst which is at least one liquid, trivalent antimony salt of an aliphatic hydrocarbon monocarboxylic acid having at least 12 carbon atoms per molecule.

8. A process for preparing colorless, linear, high-molecular weight film and fiber forming polyethylene terephthalate which comprises esterifying terephthalic acid or a lower dialkyl ester thereof with ethylene glycol to obtain the bis-2-hydroxy alkyl terephthalate intermediate; condensing said intermediate under reduced atmospheric pressures at temperatures ranging from about 225° to 310° C. in the presence of about 0.005 to 0.7% by weight of the terephthalate of a liquid trivalent antimony salt of tall oil acids as a condensation catalyst until the polymer has a reduced viscosity above 0.5 measured on a polymer sample dissolved in purified orthochlorophenol containing 0.1% water at 250° C. at a concentration of 0.5%.

9. The process of claim 8 wherein terephthalic acid is esterified with ethylene glycol.

10. The process of claim 8 wherein the lower dialkyl ester of terephthalic acid is dimethyl terephthalate.

11. The process of claim 7 wherein the condensation of the diglycol-ester intermediate takes place in the presence of about 0.005 to 0.7% by weight of the terephthalate of the liquid antimony salt under reduced atmospheric pressures.

12. A process for preparing colorless, linear, high-molecular weight film and fiber forming polyetheylene terephthalate having a reduced viscosity above 0.5 and a whiteness index between 85 and 120 which comprises esterifying terephthalic acid or the dimethyl ester thereof with ethylene glycol to obtain monomeric bis-2-hydroxyethyl terephthalate; condensing said monomer at temperatures ranging from about 225° to 310° C. under reduced atmospheric pressures in the presence of 0.005 to 0.7% by weight of the terephthalate of a liquid trivalent antimony salt of tall oil acid as a condensation catalyst.

13. The process of claim 12 wherein the dimethyl ester of the terephthalic acid is esterified with the glycol in the presence of an ester-interchange catalyst under atmospheric pressure.

14. The process of claim 12 wherein the monomer is obtained by esterifying terephthalic acid with ethylene glycol at pressures ranging up to about 150 p.s.i.g.

15. The process of claim 8 wherein the intermediate is obtained by an ester-interchange of the dialkyl ester of the terephthalic acid and ethylene glycol.

16. The process of claim 8 wherein the dialkyl ester is the dimethyl ester of terephthalic acid.

17. The process of claim 1 wherein the dialkyl esters of terephthalic acid have 1 to 4 carbon atoms in the alkyl group and the alkylene glycol has 2 to 4 carbon atoms.

18. The process of claim 1 wherein antimony salt of the monocarboxylic acid has 12 to 22 carbon atoms per molecule and is miscible in the condensation reaction medium.

19. The process of claim 13 wherein the condensation of the intermediate takes place in the presence of an effective amount of an aryl phosphite and the antimony catalyst.

20. In a process of preparing a colorless, linear, high-molecular weight film and fiber forming polyester by condensing in the presence of a catalyst a diglycol ester of (a) an alkylene glycol having 2 to 10 carbon atoms per molecule and (b) terephthalic acid or a lower dialkyl ester thereof; wherein the improvement comprises condensing said diglycol ester in the presence of an effective amount of a condensation catalyst consisting essentially of at least one trivalent antimony salt of a hydrocarbon aliphatic monocarboxylic acid having at least 12 carbon atoms per molecule and which trivalent antimony salt is liquid or miscible in the condensation reaction medium.

References Cited

UNITED STATES PATENTS

| | | | |
|---|---|---|---|
| 2,921,051 | 1/1960 | Amborski et al. | 260—75 |
| 3,028,366 | 4/1962 | Engle et al. | 260—75 |
| 3,053,809 | 9/1962 | Linville et al. | |
| 3,115,475 | 12/1963 | Griehl | 260—76 |
| 3,211,768 | 10/1965 | Considine | 260—414 |

FOREIGN PATENTS

| | | |
|---|---|---|
| 753,880 | 1/1956 | Great Britain. |
| 960,786 | 6/1964 | Great Britain. |

WILLIAM H. SHORT, Primary Examiner

LOUISE P. QUASE, Assistant Examiner

U.S. Cl. X.R.

252—431; 260—22, 414, 446